United States Patent
Yoon

(10) Patent No.: US 8,495,791 B2
(45) Date of Patent: Jul. 30, 2013

(54) CLIP FOR FIXING MAT OF VEHICLE

(75) Inventor: Ok Hee Yoon, Yangsan-si (KR)

(73) Assignee: A-Jin Industry Co., Ltd., Ulsan (KR)

( * ) Notice: Subject to any disclaimer, the term of this patent is extended or adjusted under 35 U.S.C. 154(b) by 353 days.

(21) Appl. No.: 13/054,670

(22) PCT Filed: Nov. 3, 2010

(86) PCT No.: PCT/KR2010/007688
§ 371 (c)(1),
(2), (4) Date: Jan. 18, 2011

(87) PCT Pub. No.: WO2011/071243
PCT Pub. Date: Jun. 16, 2011

(65) Prior Publication Data
US 2011/0191980 A1   Aug. 11, 2011

(30) Foreign Application Priority Data

Dec. 11, 2009 (KR) .......... 10-2009-0123097
Dec. 11, 2009 (KR) .......... 10-2009-0123098

(51) Int. Cl.
*A47G 27/04* (2006.01)
(52) U.S. Cl.
USPC .................. 16/6; 16/4; 16/5; 16/13
(58) Field of Classification Search
USPC ..................... 16/4, 5, 6, 13; 24/311
See application file for complete search history.

(56) References Cited

U.S. PATENT DOCUMENTS

| | | | | | |
|---|---|---|---|---|---|
| 3,212,152 | A | * | 10/1965 | Tanaka et al. | 24/647 |
| 4,086,679 | A | * | 5/1978 | Butler | 16/4 |
| 5,724,703 | A | * | 3/1998 | Wu | 16/4 |
| D569,240 | S | * | 5/2008 | Aoki et al. | D8/382 |
| 7,540,066 | B2 | * | 6/2009 | Aoki et al. | 16/4 |
| 8,245,368 | B2 | * | 8/2012 | Park | 24/573.11 |
| 2007/0011844 | A1 | * | 1/2007 | Aoki et al. | 16/4 |
| 2010/0122429 | A1 | * | 5/2010 | Gonzalez et al. | 16/4 |

FOREIGN PATENT DOCUMENTS
JP 2000-153731 6/2000

* cited by examiner

*Primary Examiner* — Roberta DeLisle
(74) *Attorney, Agent, or Firm* — Sherr & Jiang, PLLC

(57) ABSTRACT

Provided is a clip for fixing a mat on a carpet of a vehicle, the clip including: a lower plate disposed on a bottom surface of the carpet, and includes an insert groove on a front portion; an upper plate disposed on a top surface of the carpet, includes a hook coupled to the inserted groove in the front portion, and includes a projection at a top to which the mat is inserted; a pillar penetrating through a hole of the carpet, and connects a rear portion of the lower plate and a rear portion of the upper plate in upward and downward; a first hook formed on a bottom surface of the rear portion of the upper plate corresponding to an inner side of a front portion of the pillar; and a second hook formed on a top surface of the rear portion of the lower plate corresponding to the inner side of the front portion of the pillar, and hooked to the first hook through the hole, when the lower plate moves upward toward the upper plate based on the pillar. According to the clip, a rear portion of the clip is coupled firstly on the carpet by combining the first and second hooks, and then a front portion of the clip is coupled secondly on the carpet by combining the hook and the insert groove. Thus, fixability of the clip to the carpet is reinforced, and movement of the mat is effectively prevented.

16 Claims, 2 Drawing Sheets

CLIP FOR FIXING MAT OF VEHICLE

CROSS REFERENCE TO PRIOR APPLICATIONS

This application is a National Stage Patent Application of PCT International Patent Application No. PCT/KR2010/007688 (filed on Nov. 3, 2010) under 35 U.S.C. §371, which claims priority to Korean Patent Application Nos. 10-2009-0123097 (filed on Dec. 11, 2009) and 10-2009-0123098 (filed on Dec. 11, 2009), which are all hereby incorporated by reference in their entirety.

BACKGROUND OF THE INVENTION

1. Field of the Invention

The present invention relates to a clip for fixing a mat of a vehicle, and more particularly, to a clip for fixing a mat of a vehicle, which is installed to a carpet of a vehicle so as to fix the mat on the carpet.

2. Description of the Related Art

Generally, a carpet is placed on an interior bottom surface of a vehicle, and a mat is disposed on the carpet so as to prevent contamination of the carpet and to place feet.

Such a mat is sectioned into several pieces, a location of the mat may easily move due to an external factor, such as manipulation of a brake or an accelerator pedal, carelessness of a user, an external shock. Also, if the mat moves, it may be difficult to manipulate a pedal and cause various negligent accidents.

Accordingly, a conventional clip is used to prevent the movement of the mat by fixing the mat on the carpet. However, fixability of the conventional clip to the carpet is unstable, and thus the conventional clip may move on the carpet. Consequently, the mat may move a little.

Also, a thickness of a carpet differs according to a type of the carpet, a car model, etc. Here, since a clip having a height corresponding to the thickness of the carpet needs to be separately manufactured, standards of the clip increase and productivity of the clip decreases.

SUMMARY OF THE INVENTION

The present invention provides a clip for fixing a mat, which effectively prevents the mat from moving by reinforcing and stabilizing fixability of the clip to a carpet, and is commonly usable in carpets having various thicknesses.

According to an aspect of the present invention, there is provided a clip for fixing a mat on a carpet of a vehicle, the clip including: a lower plate disposed on a bottom surface of the carpet, and includes an insert groove on a front portion; an upper plate disposed on a top surface of the carpet, includes a hook coupled to the inserted groove in the front portion, and includes a projection at a top to which the mat is inserted; a pillar penetrating through a hole of the carpet, and connects a rear portion of the lower plate and a rear portion of the upper plate in upward and downward; a first hook formed on a bottom surface of the rear portion of the upper plate corresponding to an inner side of a front portion of the pillar; and a second hook formed on a top surface of the rear portion of the lower plate corresponding to the inner side of the front portion of the pillar, and hooked to the first hook through the hole, when the lower plate moves upward toward the upper plate based on the pillar.

A longitudinal section of the first hook may have a 'L' shape, and a longitudinal section of the second hook may have a '⌐' shape.

The clip may further include an assistance tool that is installed on an inner wall of the pillar, faces and is spaced apart from the first hook, and support a shape of the second hook by contacting an external surface of the second hook when the second hook is hooked to the first hook.

The front portion and the rear portion of the upper plate may externally extend in opposite directions respectively based on the hook and the pillar, and the clip may further include: a first support disposed on an outer side of the insert groove, and supports a lower surface of the carpet corresponding to an outer side of the hook so as to prevent the front portion of the upper plate from being lifted from the carpet; and a second support disposed on an outer side of the pillar, and supports the lower surface of the carpet corresponding to the outer side of the pillar so as to prevent the rear portion of the upper plate from being lifted from the carpet.

The clip may further include a pressurizing unit for reinforcing fixability of the clip to the carpet by pressurizing the carpet inserted between the upper plate and the lower plate upward while coupling the upper plate and the lower plate.

The pressurizing unit may be formed of a flexible material, and have a wing plate shape, wherein one end is fixed to the top surface of the lower plate and another end is extended to have inclination above the lower plate. A plurality of pressurizing units may be included, wherein one ends of the plurality of pressurizing units are fixed to a center of the top surface of the lower plate, and another ends of the plurality of pressurizing units are extended in different directions in a radial shape.

The pressurizing unit may be formed of a flexible material and have longitudinal section of a ring shape, wherein an upper portion and a lower portion of the pressurizing unit are gradually drawn near while coupling the upper plate and the lower plate. The pressurizing unit may include: a lower surface portion; an upper surface portion spaced apart from the lower surface portion upward; and a pair of connecting portions that respectively connect each end of the lower surface portion and each end of the upper surface portion in an externally protruding shape, in upward and downward, wherein the pair of connecting portions deform as the upper surface portion descends, by the carpet inserted between the upper plate and the lower plate while coupling the upper plate and the lower plate. The pair of connection portions may each include an upper piece and a lower piece based on a protruding center portion, wherein a length of the upper piece is shorter than a length of the lower piece.

According to another aspect of the present invention, there is provided a clip for fixing a mat on a carpet of a vehicle, the clip including: a lower plate disposed on a bottom surface of the carpet, and includes an insert groove at a front portion; an upper plate disposed on a top surface of the carpet, includes a hook coupled to the insert groove at a front portion, and includes a projection at a top to which the mat is inserted; a pillar penetrating through a hole of the carpet, and connects a rear portion of the lower plate and a rear portion of the upper plate in upward and downward; and a pressurizing unit formed of a flexible material and has a wing plate shape, wherein one end is fixed to the top surface of the lower plate and another end is extended to have inclination above the lower plate, so as to reinforce fixability of the clip to the carpet by pressurizing the carpet inserted between the upper plate and the lower plate upward, while coupling the upper plate and the lower plate.

A plurality of pressurizing units may be included, wherein one ends of the plurality of pressurizing units are fixed to a center of the top surface of the lower plate, and another ends of the plurality of pressurizing units are extended in different directions in a radial shape.

The front portion and the rear portion of the upper plate may externally extend in opposite directions respectively based on the hook and the pillar, and the clip may further include: a first support disposed on an outer side of the insert groove, and supports a lower surface of the carpet corresponding to an outer side of the hook so as to prevent the front portion of the upper plate from being lifted from the carpet; and a second support disposed on an outer side of the pillar, and supports the lower surface of the carpet corresponding to the outer side of the pillar so as to prevent the rear portion of the upper plate from being lifted from the carpet.

The clip may further include: a first hook formed on a bottom surface of the rear portion of the upper plate corresponding to an inner side of a front portion of the pillar; and a second hook formed on a top surface of the rear portion of the lower plate corresponding to the inner side of the front portion of the pillar, and hooked to the first hook through the hole, when the lower plate moves upward toward the upper plate based on the pillar. A longitudinal section of the first hook may have a 'ㄴ' shape, and a longitudinal section of the second hook may have a 'ㄱ' shape.

The clip may further include an assistance tool that is installed on an inner wall of the pillar, faces and is spaced apart from the first hook, and support a shape of the second hook by contacting an external surface of the second hook when the second hook is hooked to the first hook.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
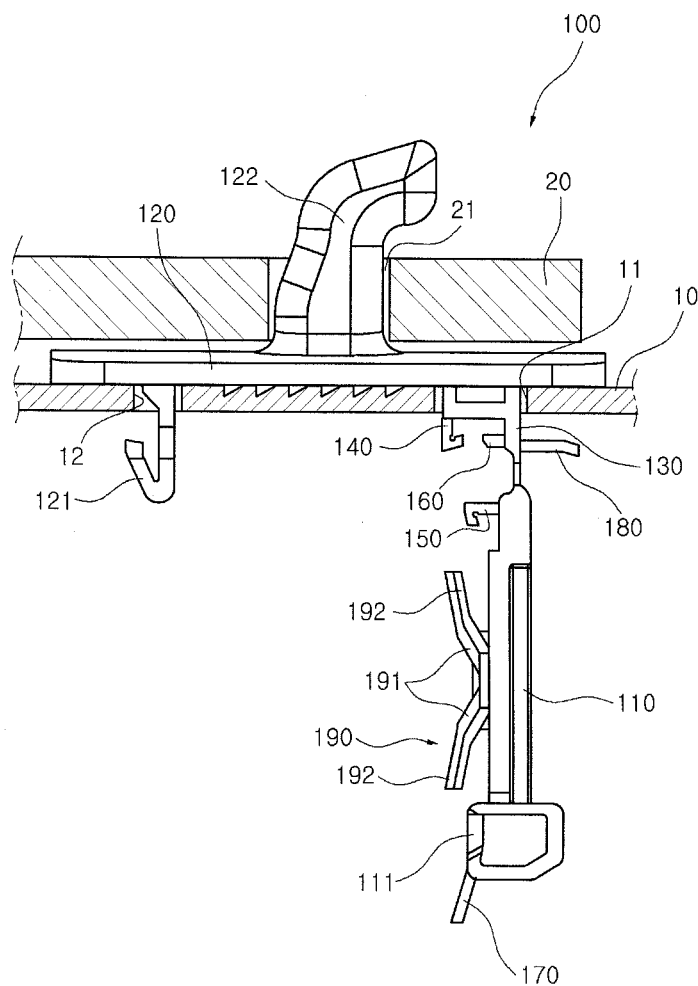
FIG. 1 is a cross-sectional view of a clip for fixing a mat of a vehicle, according to an embodiment of the present invention.
Figure 2:
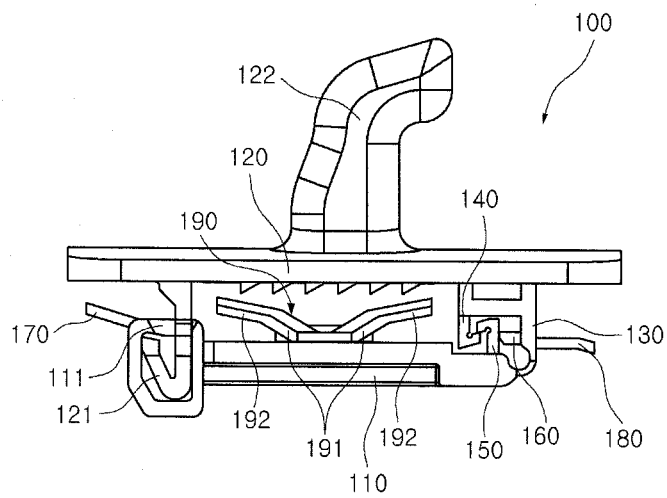
FIG. 2 is a cross-sectional view of the clip of FIG. 1, wherein a lower plate is assembled upward.

FIG. 1 is a cross-sectional view of a clip 100 for fixing a mat 20 of a vehicle, according to an embodiment of the present invention, and FIG. 2 is a cross-sectional view of the clip 100 of FIG. 1, wherein a lower plate 110 is assembled upward.

Referring to FIGS. 1 and 2, the clip 100 is used to fix the mat 20 on a carpet 10 of the vehicle, and includes the lower plate 110, an upper plate 120, a pillar 130, a first hook 140, and a second hook 150.

The lower plate 110 is disposed on a bottom surface of the carpet 10, and an insert groove 111 is formed at a front portion of the lower plate 110. Also, the upper plate 120 is placed on a top surface of the carpet 10, and a hook 121 coupled to the insert groove 111 is formed at a front portion of the upper plate 120.

An open hole 12 is formed on the carpet 10 so that the hook 121 is inserted into the insert groove 111 of the lower plate 110. Also, a location of the mat 20 may be fixed above the carpet since a projection 122, which is inserted into a through hole 21 of the mat 20, is formed on the upper plate 120.

The pillar 130 penetrates through a hole 11 of the carpet 10, and connects a rear portion of the lower plate 110 and a rear portion of the upper plate 120 in upward and downward. The lower plate 110 may move upward toward the upper plate 120 based on the pillar 130. When the lower plate 110 moves upward as shown in FIG. 2, the hook 121 is hooked to the insert groove 111 of the lower plate 110.

The first hook 140 is formed on a bottom surface of the rear portion of the upper plate 120, which corresponds to an inner side of a front portion of the pillar 130. Also, the second hook 150 is formed on a top surface of the rear portion of the lower plate 110, which corresponds to the inner side of the front portion of the pillar 130. The second hook 150 is hooked to the first hook 140 through the hole 11 when the lower plate 110 moves upward toward the upper plate 120 based on the pillar 130.

Here, a longitudinal section of the first hook 140 has a 'ㄴ' shape, and a longitudinal section of the second hook 150 has a 'ㄱ' shape. In other words, bent directions of the first and second hooks 140 and 150 are different so that the first and second hooks 140 and 150 are interlocked together. When a bent angle is below 90°, coupling of the first and second hooks 140 and 150 may be reinforced, and the first and second hooks 140 and 150 may be effectively prevented from being disengaged after being coupled.

When the clip 100 is assembled on the carpet 10, a rear portion of the clip 100 is combined firstly by combining the first and second hooks 140 and 150. Then, a front portion of the clip 100 is combined secondly by combining the hook 121 and the insert groove 111. Fixability of the clip 100 to the carpet 10 may be reinforced and dislocation or movement of the clip 100 on the carpet 10 may be prevented via such first and second combinations. Accordingly, a location of the mat 20 inserted into the projection 122 of the clip 100 is also stably maintained, and thus movement of the mat 20 is effectively prevented, thereby helping safe driving.

The clip 100 includes an assistance tool 160 that is disposed on an inner wall of the pillar 130, and faces and is spaced apart from the first hook 140. The assistance tool 160 supports a shape of the second hook 150 by contacting an external surface of the second hook 150 when the second hook 150 is coupled to the first hook 140. Deformation, tilting, or the like of the second hook 150 generated when a shock or an external force is applied on the second hook 150 while coupling the second hook 150 to the first hook 140 may be prevented by using the assistance tool 160.

Referring to FIGS. 1 and 2, the front portion and the rear portion of the upper plate 120 externally extend in different directions, respectively based on the hook 121 and the pillar 130. Here, the clip 100 includes a first support 170 and a second support 180.

The first support 170 is disposed on an outer side of the insert groove 111, and supports the lower surface of the carpet 10 corresponding to the outer side of the hook 121, when the upper plate 120 and the lower plate 110 are coupled to each other. When the clip 100 does not include the first support 170, the carpet 10 corresponding to the outer side of the hook 121 may droop downward. Accordingly, the front portion of the upper plate 120 may be lifted from the carpet 10. In this case, view of the carpet 10 near the clip 100 may not be good, and a shape of the clip 100 may be deformed or the clip 100 may be damaged as impurities go between the clip 100 and the carpet 10.

The second support 180 is disposed on an outer side of the pillar 130, and supports the lower surface of the carpet 10 corresponding to the outer side of the pillar 130, thereby preventing the rear portion of the upper plate 120 from being lifted from the carpet 10. Since a purpose of using the second support 180 is identical to that of the first support 170, details thereof will not be repeated.

Referring to FIGS. 1 and 2, the clip 100 includes a pressurizing unit 190 that reinforces fixability of the clip 100 to the carpet 10 by pressurizing the carpet 10 inserted between the upper plate 120 and the lower plate 110 upward while coupling the upper plate 120 and the lower plate 110.

The pressurizing unit 190 is formed of a flexible material, and has a wing plate shape wherein one end 191 is fixed to the top surface of the lower plate 110 and another end 192 is extended to have inclination above the lower plate 110. The other end 192 of the pressurizing unit 190 descends and pressurizes the carpet 10 according to a thickness of the carpet 10 inserted between the upper plate 120 and the lower plate 110. The descending of the other end 192 is resulted from characteristics of the flexible material, and when an external pressure is released, i.e., when the carpet 10 is removed, the other end 192 may return to an original state.

A plurality of pressurizing units 190 are disposed on the lower plate 110. Here, the ends 191 of the plurality of pressurizing units 190 are fixed to a center of the top surface of the lower plate 110, and the other ends 192 of the plurality of pressurizing units 190 are extended in different directions in a radial shape. In FIGS. 1 and 2, the clip 100 includes two pressurizing units 190. When a plurality of pressurizing units 190 are used, a pressurizing force may be uniformly applied on several parts of the carpet 10.

The thickness of the carpet 10 differs based on a type of the carpet 10, a car model, etc. When the pressurizing unit 190 is not used, the clip 100 having a height corresponding to the thickness of the carpet 10 needs to be separately manufactured, and thus standards of the clip 100 increases and productivity of the clip 100 decreases. For example, a height of the pillar 130 related to the height of the clip 100 needs to be differently designed according to the thickness of the carpet 10.

However, when the carpet 10 inserted between the upper plate 120 and the lower plate 110 is pressurized upward by using the pressurizing unit 190 formed of the flexible material as described above, the fixability of the clip 100 to the carpet 10 may be reinforced, and the clip 100 may be commonly used to carpets having various thicknesses according to the characteristics of the flexible material. In other words, the clip 100 may be flexibly used to the carpet 10 having any thickness, and thus the clip 100 having different standards may not be separately manufactured according to the thickness of the carpet 10. Also, since the other ends 192 are above the lower plate 110 based on the ends 191, the pressurizing units 190 effectively absorb an external shock.

Figure 3:
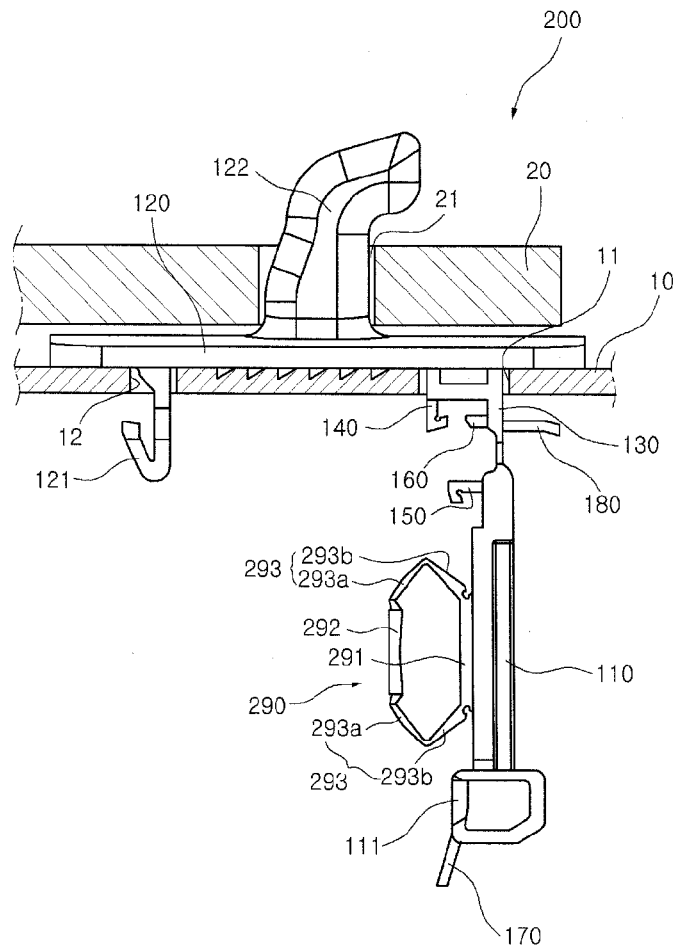
FIG. 3 is a cross-sectional view of a clip for fixing a mat of a vehicle, according to another embodiment of the present invention.
Figure 4:
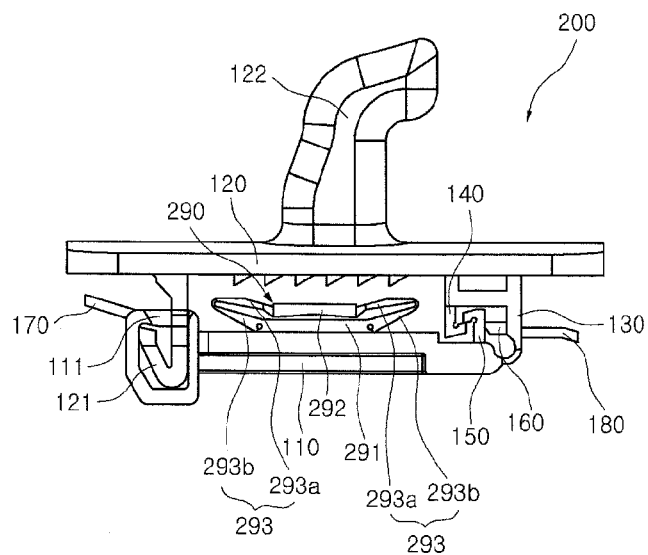
FIG. 4 is a cross-sectional view of the clip of FIG. 3, wherein a lower plate is assembled upward.

FIG. 3 is a cross-sectional view of a clip 200 for fixing the mat 20 of a vehicle, according to another embodiment of the present invention, and FIG. 4 is a cross-sectional view of the clip of FIG. 3, wherein the lower plate 110 is assembled upward. FIGS. 3 and 4 illustrate a pressurizing unit 290 according to another embodiment of the present invention.

The pressurizing unit 290 used in the clip 200 according to the current embodiment of the present invention is formed of a flexible material and has a longitudinal section of a ring shape, and thus an upper portion and a lower portion of the pressurizing unit 290 are gradually drawn near while coupling the upper plate 120 and the lower plate 110. In other words, the pressurizing unit 290 has the longitudinal section of the ring shape, wherein the center is empty, before the upper plate 120 and the lower plate 110 are coupled to each other, as shown in FIG. 3. Then, when the upper plate 120 and the lower plate 110 are coupled to each other, the upper portion and the lower portion of the pressurizing unit 290 are gradually drawn near and pressurize the carpet 10 according to the thickness of the carpet 10, as shown in FIG. 4. Here, when the thickness of the carpet 10 is thick, the upper portion and the lower portion are gradually drawn near and adhere to each other.

In detail, the pressurizing unit 290 includes a lower surface portion 291, an upper surface portion 292 spaced apart from the lower surface portion 291 above the lower surface portion 291, and a pair of connecting portions 293 that respectively connect each end of the lower surface portion 291 and each end of the upper surface portion 292 in an externally protruding shape, in upward and downward.

Accordingly, the connecting portions 293 are deformed as the upper surface portion 292 descends, by the carpet 10 inserted between the upper plate 120 and the lower plate 110 while coupling the upper plate 120 and the lower plate 110, and the upper surface portion 292 and the lower surface portion 291 are drawn near to each other. Such a deformed state of the connecting portions 293 may be returned back to an original state when an external force is released, i.e., when the carpet 10 is removed. The pressurizing unit 290 may pressurize the carpet 10 according to the deformation of the connecting portions 293.

Also, the pair of connection portions 293 each includes an upper piece 293a and a lower piece 293b based on a protruding center portion. Here, a length of the upper piece 293a is shorter than a length of the lower piece 293b. Accordingly, the upper surface portion 292 is drawn near to the lower surface portion 291 of the pressurizing unit 290 by the thickness of the carpet 10 inserted between the upper plate 120 and the lower plate 110, when the upper plate 120 is coupled to the lower plate 110. At the same time, a center of the connecting portion 293 is erected upward higher than the upper surface portion 292 and thus the longitudinal section of the pressurizing unit 290 has a calyx shape. Accordingly, the connecting portion 293, specifically the upper piece 293a effectively pressurizes the carpet 10. Also, the lower piece 293b of the pressurizing unit 290 effectively buffers an external shock as the lower piece 293b is tilted upward and lifted via the calyx shape. Here, a final pressurized shape of the pressurizing unit 290 of FIG. 4 is similar to a shape of the pressurizing unit 190 of FIG. 2.

According to a clip for fixing a mat of a vehicle of the present invention, a rear portion of the clip is firstly coupled by combining a first hook and a second hook, and then a front portion of the clip is secondly coupled by combining a hook and an insert groove while assembling the clip on a carpet. Accordingly, fixability of the clip to the carpet can be reinforced and movement of the mat can be effectively prevented.

Also, the fixability of the clip to the carpet can be reinforced by pressurizing the carpet inserted between an upper plate and a lower plate upward while coupling the upper plate and the lower plate by using a pressurizing unit formed of a flexible material. Furthermore, according to characteristics of the flexible material, the clip having different standards may not be separately manufactured according to a thickness of the carpet, and the clip can be commonly used for carpets having various thicknesses.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A clip for fixing a mat on a carpet of a vehicle, the clip comprising:
    a lower plate disposed on a bottom surface of the carpet, and comprises an insert groove on a front portion;
    an upper plate disposed on a top surface of the carpet, comprises a hook coupled to the inserted groove in the front portion, and comprises a projection at a top to which the mat is inserted;
    a pillar penetrating through a hole of the carpet, and connects a rear portion of the lower plate and a rear portion of the upper plate in upward and downward;
    a first hook formed on a bottom surface of the rear portion of the upper plate corresponding to an inner side of a front portion of the pillar; and
    a second hook formed on a top surface of the rear portion of the lower plate corresponding to the inner side of the front portion of the pillar, and hooked to the first hook through the hole, when the lower plate moves upward toward the upper plate based on the pillar.

2. The clip of claim 1, wherein a longitudinal section of the first hook has a '⌊' shape, and a longitudinal section of the second hook has a '⌐' shape.

3. The clip of claim 2, further comprising an assistance tool that is installed on an inner wall of the pillar, faces and is spaced apart from the first hook, and supports a shape of the second hook by contacting an external surface of the second hook when the second hook is hooked to the first hook.

4. The clip of claim 1, wherein the front portion and the rear portion of the upper plate externally extend in opposite directions respectively based on the hook and the pillar, and the clip further comprises:
    a first support disposed on an outer side of the insert groove, and supports a lower surface of the carpet corresponding to an outer side of the hook so as to prevent the front portion of the upper plate from being lifted from the carpet; and
    a second support disposed on an outer side of the pillar, and supports the lower surface of the carpet corresponding to the outer side of the pillar so as to prevent the rear portion of the upper plate from being lifted from the carpet.

5. The clip of claim 1, further comprising a pressurizing unit for reinforcing fixability of the clip to the carpet by pressurizing the carpet inserted between the upper plate and the lower plate upward while coupling the upper plate and the lower plate.

6. The clip of claim 5, wherein the pressurizing unit is formed of a flexible material, and has a wing plate shape, wherein one end is fixed to the top surface of the lower plate and another end is extended to have inclination above the lower plate.

7. The clip of claim 6, wherein a plurality of pressurizing units are included, wherein one ends of the plurality of pressurizing units are fixed to a center of the top surface of the lower plate, and another ends of the plurality of pressurizing units are extended in different directions in a radial shape.

8. The clip of claim 5, wherein the pressurizing unit is formed of a flexible material and has longitudinal section of a ring shape, wherein an upper portion and a lower portion of the pressurizing unit are gradually drawn near while coupling the upper plate and the lower plate.

9. The clip of claim 8, wherein the pressurizing unit comprises:
    a lower surface portion;
    an upper surface portion spaced apart from the lower surface portion upward; and
    a pair of connecting portions that respectively connect each end of the lower surface portion and each end of the upper surface portion in an externally protruding shape, in upward and downward,
    wherein the pair of connecting portions deform as the upper surface portion descends, by the carpet inserted between the upper plate and the lower plate while coupling the upper plate and the lower plate.

10. The clip of claim 9, wherein the pair of connection portions each comprises an upper piece and a lower piece based on a protruding center portion, wherein a length of the upper piece is shorter than a length of the lower piece.

11. A clip for fixing a mat on a carpet of a vehicle, the clip comprising:
    a lower plate disposed on a bottom surface of the carpet, and comprises an insert groove at a front portion;
    an upper plate disposed on a top surface of the carpet, comprises a hook coupled to the insert groove at a front portion, and comprises a projection at a top to which the mat is inserted;
    a pillar penetrating through a hole of the carpet, and connects a rear portion of the lower plate and a rear portion of the upper plate in upward and downward; and
    a pressurizing unit formed of a flexible material and has a wing plate shape, wherein one end is fixed to the top surface of the lower plate and another end is extended to have inclination above the lower plate, so as to reinforce fixability of the clip to the carpet by pressurizing the carpet inserted between the upper plate and the lower plate upward, while coupling the upper plate and the lower plate.

12. The clip of claim 11, wherein a plurality of pressurizing units are included, wherein one ends of the plurality of pressurizing units are fixed to a center of the top surface of the lower plate, and another ends of the plurality of pressurizing units are extended in different directions in a radial shape.

13. The clip of claim 11, wherein the front portion and the rear portion of the upper plate externally extend in opposite directions respectively based on the hook and the pillar, and the clip further comprises:
    a first support disposed on an outer side of the insert groove, and supports a lower surface of the carpet corresponding to an outer side of the hook so as to prevent the front portion of the upper plate from being lifted from the carpet; and
    a second support disposed on an outer side of the pillar, and supports the lower surface of the carpet corresponding to the outer side of the pillar so as to prevent the rear portion of the upper plate from being lifted from the carpet.

14. The clip of claim 13, further comprising:
    a first hook formed on a bottom surface of the rear portion of the upper plate corresponding to an inner side of a front portion of the pillar; and
    a second hook formed on a top surface of the rear portion of the lower plate corresponding to the inner side of the front portion of the pillar, and hooked to the first hook through the hole, when the lower plate moves upward toward the upper plate based on the pillar.

15. The clip of claim 14, wherein a longitudinal section of the first hook has a '⌊' shape, and a longitudinal section of the second hook has a '⌐' shape.

16. The clip of claim 15, further comprising an assistance tool that is installed on an inner wall of the pillar, faces and is spaced apart from the first hook, and supports a shape of the second hook by contacting an external surface of the second hook when the second hook is hooked to the first hook.

* * * * *